United States Patent [19]

Nardi

[11] Patent Number: 4,912,731
[45] Date of Patent: Mar. 27, 1990

[54] PLASMA FOCUS APPARATUS WITH FIELD DISTORTION ELEMENTS

[76] Inventor: Vittorio Nardi, 101 Daniel Low Ter., Staten Island, N.Y. 10301

[21] Appl. No.: 37,753

[22] Filed: Apr. 13, 1987

[51] Int. Cl.$^4$ .......................... G21B 1/00; H01J 35/00
[52] U.S. Cl. ................................ 376/145; 315/111.21; 315/111.81; 378/119; 313/231.41; 313/231.61
[58] Field of Search .................. 376/144, 145; 315/111.21, 111.81; 313/231.41, 231.61; 378/119

[56] References Cited

U.S. PATENT DOCUMENTS

| | | | |
|---|---|---|---|
| 3,579,028 | 5/1971 | Paine | 315/111.21 |
| 3,854,097 | 12/1974 | Fletcher et al. | |
| 4,042,848 | 8/1977 | Lee | |
| 4,494,043 | 1/1985 | Stallings et al. | 376/144 |
| 4,596,030 | 6/1986 | Herziger et al. | 378/119 |
| 4,627,086 | 12/1986 | Kato et al. | 378/119 |
| 4,715,054 | 12/1987 | Kato et al. | 315/111.21 |

OTHER PUBLICATIONS

*Energy Storage, Compression and Switching*, vol. 2, "Production of GW Electron & Ion Beams by Focussed Discharges", Bostick et al. (III), pp. 267–287, Plenum Press, 1983.

*Energy Storage, Compression and Switching*, "Nonuniform Energy Concentration in Focussed Plasma", Bostick et al. (IV), pp. 261–270, Plenum Press, 1976.

*Plasma Physics*, part B, vol. 9, Louberg et al., Academic Press, "Dense Plasma Focus", pp. 187–249.

"Formation and Decay of Vortex Filaments in a Plasma Current Sheath", W. H. Bostick, V. Nardi and W. Prior, pp. 375–392, Stevens Institute of Technology, Hoboken, N.J., U.S.A. (1971) (Bostick et al. (I)).

"Influence of Insulator On Plasma-Focus Discharge", M. Borowiecki, et al., S. Kaliski Institute of Plasma Physics and Laser Microfusion, P.O. Box 49, 00-908 Warsaw, Poland, pp. 86–89, (1985).

"Measurements on Pinhole Camera Photographs with Particle Detectors and Plasma Focus Optimization", W. H. Bostick, et al., Stevens Institute of Technology, Hoboken, N.J., U.S.A., pp. 128–131 (1985) (Bostick et al. (II)).

*Primary Examiner*—Harvey E. Behrend
*Attorney, Agent, or Firm*—Gottlieb, Rackman & Reisman

[57] ABSTRACT

A plasma focus apparatus has a field distortion element in the interelectrode gap at the breech end displaced from the sleeve of insulating material between the electrodes. As a result the neutron yield of the accelerator (which should be considered as representative of the good performance of a plasma focus device in all applications) is at least 5 times the yield in the absence of the field distortion element. A knife blade is the preferred embodiment of the field distortion element.

17 Claims, 5 Drawing Sheets

PLASMA FOCUS APPARATUS WITH FIELD DISTORTION ELEMENTS

BACKGROUND OF THE INVENTION

This invention relates to an improvement in plasma focus devices. In particular it relates to an improvement in the neutron yield, in the quality of the current sheath and in the consistency of the performance of a plasma focus device by empoying a novel design for a field distortion element.

Plasma focus devices are plasma coaxial accelerators designed to employ a high-current pinch effect at the end of a central conductor in order to produce high neutron fluxes. See, e.g. W. H. Bostick, V. Nardi and W. Prior, *Formation and Decay of Vortex Filaments in a Plasma Current Sheath*, Proc. Int. Sym. on Dynamics of Ionized Gases (1971). Plasma focus devices have utility also as pulsed particle beam accelerators, plasma accelerators, X-ray radiation sources, nuclear fusion reactors, neutron sources, and megamp opening switches.

In these devices a plasma focus is usually formed by a pair of coaxial electrodes with a sleeve of insulating material between the electrodes. The insulator sleeve closely encircles the inner electrode to within manufacturing tolerances usually of less than 1 mm and electrically separates the anode from the cathode. These electrodes are typically contained in a tank filled with suitable pressureized gas such as deuterium. The plasma focus device typically employs as an energy source a low inductance power supply such as a capacitor bank and a system of one or more low-inductance switches in the power-transmission lines between the power-supply and the electrodes, for producing megamp, microsec, electric discharges.

These electric discharges produce a shock-driving current sheath (sometimes having a corrugated filamentary structure). Deuterons and electrons present in the pinched plasma at the final stage of the discharge are accelerated at energies many times higher than the applied potential of the power supply. The current sheath advances down the length of the electrodes and in the final stage pinches-in at the end of the electrodes typically collapsing on the axial region of the discharge. Neutrons are generated in the plasma typically starting at the pinch formation up to 50 to 500 nsec after the pinch giving a relatively long neutron pulse (20–500 nsec).

A critical role in the performance of plasma focus devices is played by the quality of the plasma current sheath in the interelectrode gap of the two coaxial electrodes where the bulk of the interelectrode current is concentrated. The quality of the current sheath is described by the peak current density $J_m$ on the sheath, the reciprocal of the current sheath thickness $1/d$, and the current-sheath speed of propagation $v_s$ along the electrode axis. The quality controls the efficiency of the process of concentrating and transferring the energy initially stored in the external power supply (e.g., a capacitor bank) to the plasma region at the front end (muzzle) of the electrodes, where the current sheath converges and focuses at the end of the run-down phase between the electrodes. The efficiency of the energy transfer process ordinarily increases for increasing values of $J_m$, $d^{-1}$, and $v_s$ for a given power supply capacitance and peak charging potential. In the final stage of the plasma focus discharge where the current sheath implodes on the electrode axis a plasma current channel forms in which the energy density is increased by a factor typically of $10^8$ as compared to the initial energy density in the capacitor bank.

The use of field distortion elements to improve the performance of plasma focus devices is known. The use of a tight fitting type of knife-edge at the breech end of a coaxial electrode for improving the plasma focus performance has been used and reported in the literature. W. H. Bostick, C. M. Luo, V. Nardi, C. Powell, *Measurements on Pinhole Camera Photographs With Particle Detectors And Plasma Focus Optimization*, Proc. 4th Int. Workshop On Plasma Focus and Z-Pinch Research, pp. 128–31 (Warsaw 1985); M. Borowiecki et al, *Influence Of Insulator On Plasma-Focus Discharge, Ibid*, pp. 86–89 (Warsaw 1985). In those applications the knife edge internal surface and the sharp edge of the cylindrical knife are resting on or are very close to (i.e. to within manufacturing tolerances less than approximately 1 mm) the outer surface of the insulator sleeve. This small-radius knife edge increases the neutron yield in deuterium by a factor between 1.3 and 2 in plasma focus systems operating with an energy from about 1 kilojoule (kJ) to about 100 kJ at optimum conditions of operation. When such knife edges are employed, however, there remains a fluctuation from shot to shot in the performance of the plasma focus device for repeated pulses (i.e. "shots") of the devices.

BRIEF DESCRIPTION OF THE PRESENT INVENTION

It has been discovered in the present invention that an improvement of dramatic magnitude in performance and consistency of otherwise optimized plasma focus apparatus occurs if a knife edge or other suitably configured field distortion element is employed having a relatively larger displacement from the insulator surface (e.g. 3 mm). In particular, the electrical resistivity is reduced during the onset of the discharge by a reduction in the emission of impurity ions from the surface of the insulator sleeve and the neutron yield increases by a factor of 5 or more as compared to the case in which there is no field distortion element and by a factor of about 3 as compared to the case of a "tight" or small radius knife edge of the prior art.

It is an object of the present invention to improve the energy densification in the plasma current channel of a plasma focus apparatus by the insertion in the interelectrode gap of a field distortion element which greatly enhances the positive effect of such element upon the distribution of the interelectrode current. An effective method of measuring the efficiency of this energy densification process is to measure in a single plasma-focus discharge the neutron emission from $D(d,n)^3He$ nuclear fusion reactions if the discharge chamber is filled with deuterium gas (typically 1–10 Torr of $D_2$).

A further object of the present invention is to improve the quality of the current sheath at the onset of the discharge which controls the quality of the current sheath at any other later time and controls the reproducibility of performance of a plasma focus device under optimized conditions by a suitable field-distortion element inserted between the coaxial electrodes of a plasma focus system.

It is yet a further object of the present invention to lift the forming current sheath above the insulator surface and to reduce the emission of impurity ions from the surface of the insulator sleeve at the onset of the discharge which plays a critical role at all the successive stages of the discharge thereby reducing the electric resistivity and preventing an increase of the current-sheath thickness during the interelectrode discharge onset stage and at later stages.

DESCRIPTION OF THE DRAWINGS

FIGS. 4 A-B are histograms of the percent of shots as a function of $Y_n$.

DETAILED DESCRIPTION OF A PREFERRED EMBODIMENT

Figure 1:
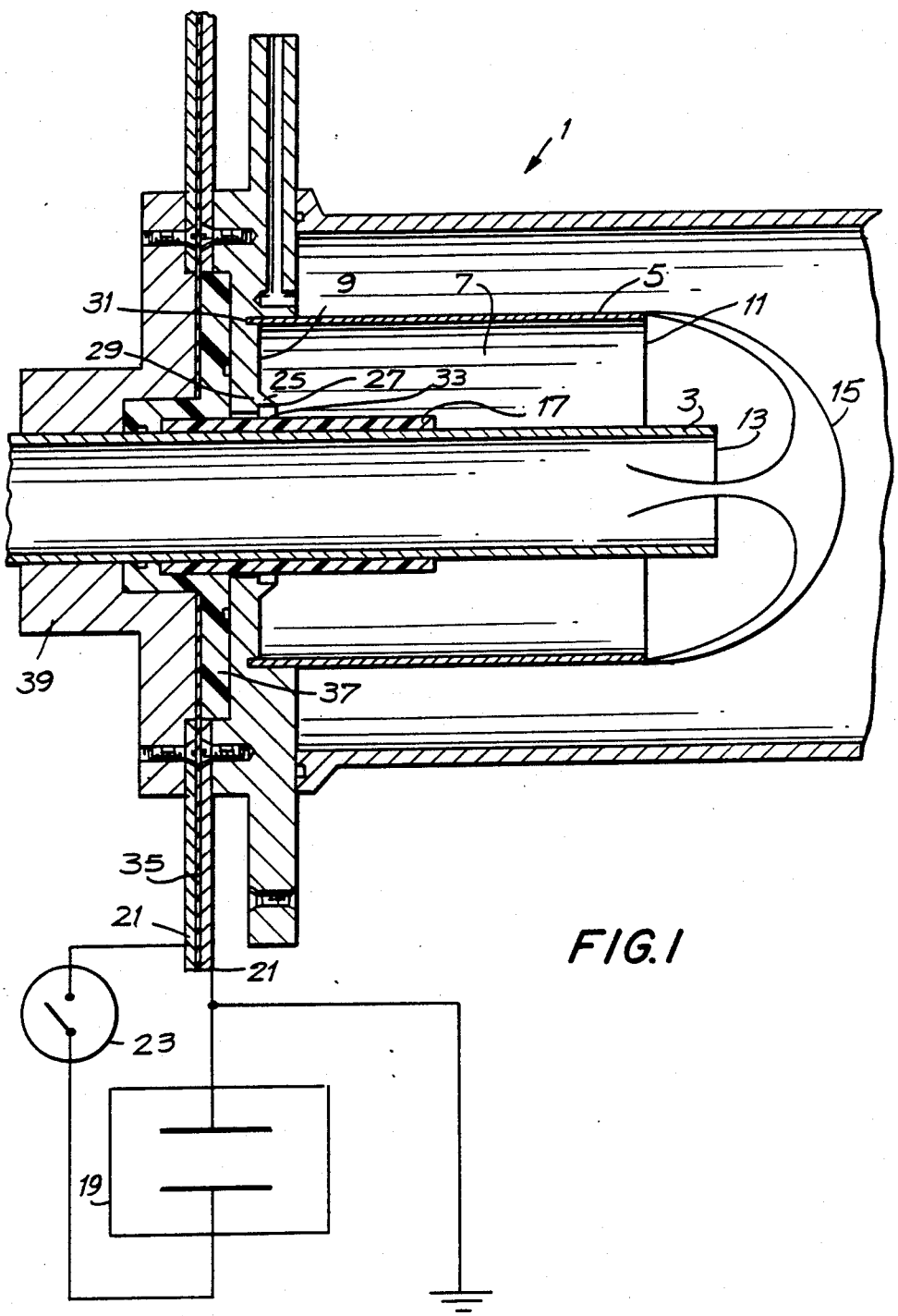
FIG. 1 is a schematic sectional view of a cylindrical symmetric plasma focus apparatus.
Figure 2:
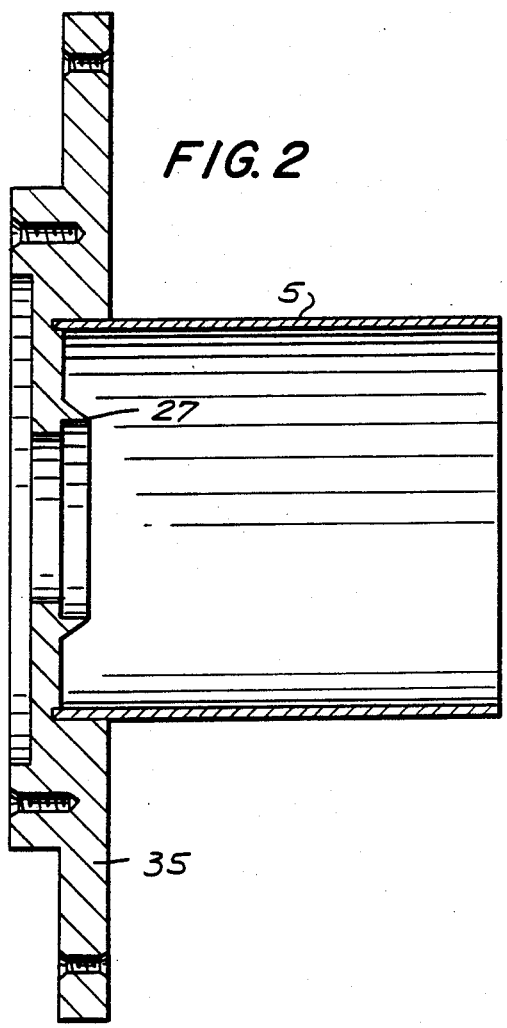
FIG. 2 is a sectional view of a portion of the plasma focus apparatus of FIG. 1 showing the field distortion element of the apparatus.

A preferred embodiment of the present invention is shown in FIG. 1. This preferred embodiment employs a J. Mather type geometry of the coaxial electrodes. In such a system the inner electrode diameter is smaller than the electrode length. An alternative geometry is the N. V. Filippov type, where the center electrode diameter is larger than, or about equal to the electrode length. Another known non-coaxial system in which the discoveries relating to the improvement in field distortion elements have application is the Z pinch system in which the two electrodes are not coaxial but are opposed to each other.

It should be understood that the primary application of the present invention is to improve the performance of the system which is otherwise at or near optimum conditions for that system. Thus where the present invention is employed in a geometry different from the plasma focus geometry of the preferred embodiment the dimensions and other parameters of the system (e.g. of the power supply) should preferably be chosen to optimize the performance of that system in the absence of the present invention. The optimizing conditions and parameters in the absence of the present invention are well known to persons skilled in this art. The following description of a single preferred embodiment provides the conditions and parameters for the particular energy level stated.

The dimensions in millimeters reported are typical of a plasma focus system optimized for operation at an energy level from about 5 kJ at a potential of approximately 14 kV to 10 kJ at a potential of 20 kV. For higher values of the energy, depending on the operating voltage and on the parameters of the power supply, some changes in the plasma focus parameters (electrode radii and lengths) should be employed in accord with the optimizing values known to a person of ordinary skill and reported in the literature.

A detailed description of plasma focus systems, their characteristics of construction, and optimized mode of operation are reported in the literature for example by the following papers whose disclosures are incorporated herein by reference: J. W. Mather, "Dense Plasma Focus", *Method of Experimental appropriate Physics Vol. 9 Part B*, pp 187-249, H. R. Griem & R. H. Lovberg, Eds. (Academic Press, N.Y. 1971); V. Nardi et al, "Magnetic Field Higher Than 100 MG Produced In The Current Sheath Of A Coaxial Accelerator", *Colloques Internationaux C.N.R.S., N. 242 - Physique Sous Champs Magnetiques Intenses*, pp. 129-138 (CNRS Paris, France 1974); *Energy Storage, Compression And Switching, Vols.* 1-2, W. H. Bostick, V. Nardi, Eds. (Plenum, New York 1976, 1983).

In a preferred embodiment of the invention to be described a cylindrical symmetrical plasma focus device is generally depicted at 1. It comprises inner 3 and outer 5 coaxial electrodes displaced from each other by an interelectrode gap 7. Typical values for the dimensions of the electrodes are 118 mm and 138 mm axial length for the outer and inner electrodes 5 and 3 respectively, measured from the breech wall 9. Their respective diameters are 10 cm (id) and 34.3 mm (od). The electrodes have respective muzzle ends 11 and 13 at which the current sheath 15 forms during operation of the apparatus. A sleeve 17 of electrically insulating material such as alumina or pyrex is disposed between electrodes 3 and 5, closely encircling (to within industrial tolerances of about 1 mm) the inner electrode 3.

The electrodes are enclosed within a tank sealed (not shown) from the atmosphere and filled with a gas, preferably comprising deuterium at a pressure of 1 to 10 Torr. Deuteriumtritium gas may be used to maximize fusion events. Heavy nuclei gases such as argon may be used to maximize X-ray yield. Alternatively the outer electrode if properly closed at both ends, can be used as discharge vessel without need of an external-electrode-containing tank. In that event the axial pinch is directly connected to the outer electrode, not via the off-axis part of the current sheath.

A low inductance power supply 19, such as a capacitor bank is connected by transmission lines 21 to coaxial electrodes 3 and 5 through at least one low inductance switch 23 capable of producing megamp microsecond electric discharges across the coaxial electrodes. An insulator stack of foil 35 is between two power line plates. An insulator 37 e.g. polyvinylchloride, silicon rubber seperates two breach plates (31, 39) each of which is connected to one of two electrodes 3 and 5. The impedance of the power supply has a negligible ohmic component. The inductance of the power supply is preferably equal to the sum of the inductance of the coaxial electrodes, the inductance of the power transmission line 21 and the inductance of the switch means 23. The condition of equality is usually met during normal (i.e., optimized) conditions of operation of a plasma focus device and is an example of the constraints which connect the parameters of a plasma focus system during the optimized mode of operation.

A field distortion means 25 is disposed in the interelectrode gap at the breech end. In a preferred embodiment the field distortion means comprises a cylindrical knife edge 27 usually having a thicker base 29 electrically connected to the breech side 31 of the outer electrode 5 and displaced from the outer surface 33 of the insulator sleeve 17 by a suitable distance. It has been found that this distance is a compromise between the necessity of the field distortion means being close to the insulator surface in order to minimize the inductance of the onset current sheath and the opposite need for the field distortion means to be far from the insulator surface in order to avoid the emission of impurity ions (and as one effect the negative consequence of high resistivity). For this particular geometry the preferred range is about 2 to 4 mm.

The net result of using a circular knife edge is, among other advantages, a five fold or larger increase in the neutron yield per discharge from the D—D fusion reaction for an otherwise optimized system having a fixed value of the energy in the power supply, of the peak voltage on the capacitor bank, of the filling pressure and of the usual geometric parameters of the electrodes and insulating materials known to persons skilled in this art to optimize performance. This increase of the neutron yield qualifies the improved plasma focus device with field distortion elements as a suitable neutron source for a variety of practical applications including neutron radiography applications.

The use of a plasma focus as a neutron source is one of the most important applications. However, the improvements introduced by the field distortion means of the present invention are realized also for other applications such as, for example, an x-ray source, or a fusion reactor, (e.g. by employing a mixture of 50% of deuterium and 50% of tritium). In the latter case the neutron yield is observed to increase by a factor 100 as compared to the yield with a pure deuterium filling, but the device has drawbacks in the levels of radioactivity associated with the tritium.

The invention is particularly useful if a neutron source of very high intensity is required. The invention can also be employed as an opening megampere, microsecond opening switch.

Figure 3A:
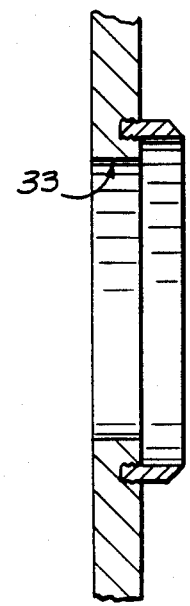
FIGS. 3 A-E are sectional views of an alternative embodiments of a field distortion element.
Figure 3E:
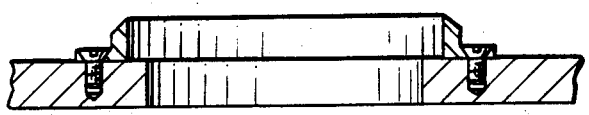
Figure 3D:
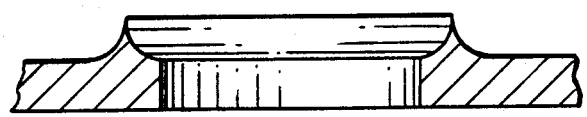
Figure 3C:
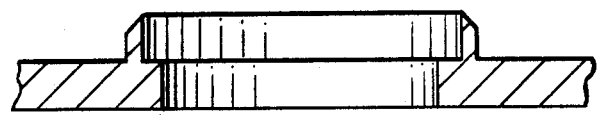
Figure 3B:
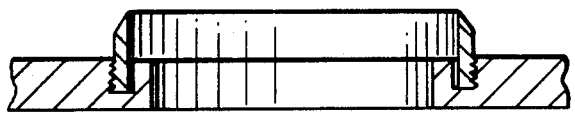

The exact shape of the field distortion means of the present invention is not critical. It may, for example, be formed from discreet pins extending axially from the breech wall maintaining a displacement from the outer insulator surface 33 as depicted in FIG. 3A. Thirty six pins distributed uniformly azimuthally will suffice. Other embodiments are depicted in FIGS. 3A–E which exhibit different manners of attachment (screwing a ring, screwing individual pins, and bolting). The field distortion means is fashioned from a conducting material and may be bolted to the breech wall or attached by any other secure and convenient means including the possibility of being a protrusion of the back plate which is part of the back plate itself. Its length extending axially from the breech wall 9 in this preferred embodiment is 2 to 14 mm and optimally 3 to 12 mm.

A suitable circular knife edge can be a cylinder of conducting material (such as a segment of a metallic pipe) with a wall thickness which decreases toward the front end (muzzle side). The wall thickness of the field distortion means at the breech side is not critical and can be chosen to accommodate the method for attaching the field distortion means to the plasma focus back plate on which the outer electrode is fixed. The field distortion means' cross section in a plane which contains the electrode axis can also be a triangle or have a triangular shape with curved sides (see FIG. 3). As stated, the length of the knife edge can be chosen to be between 2 to 14 mm with an optimum value of between 3 and 12 mm. We have preferred 7 mm for our particular geometry. A longer length is essentially equivalent to reducing the length of the insulator sleeve 17 from a preferred value of about 55 mm measured from the breech wall, which may effectively reduce the plasma focus optimization conditions.

The preferred field distortion means 27 of the present invention comprise metallic inserts in the interelectrode gap of a plasma focus machine. They sharpen the initial current distribution at the time of breakdown on the insulator sleeve at the breech. This in turn, affects the thickness of the current sheath in all successive stages, from sheath lift-off from the insulator sleeve to pinch formation and to the pinch breakdown stage which coincide with and define the time limits of the "open" condition of a plasma focus used as an opening switch.

A knife edge can be advantageously used also in other types of high current discharges as Z-pinch discharges without a rundown phase of the current sheath in interelectrode gap with a different low inductance electrode geometry. In this case the two electrode ends are facing each other and breakdown and onset of the discharge do not occur along the surface of any insulator, separating the electrodes but in the free space between the two ends of the electrodes. In these Z-pinches the diameter of a circular knife edge attached to the front end of the cathode can be selected for optimizing conflicting requirements as, (a) a minimum diameter to have a maximum of current density starting from the onset stage 3 of the discharge and (b) a relatively large diameter to have a minimum inductance of the plasma-current distribution at the onset of the discharge peaked on a current sheath bound to the knife edge. The numerical value of the optimum radius will be dependent on the level of energy operation.

The performance of a plasma focus apparatus as an opening switch is determined from the rate at which the pinch disintegrates as a result of the surge of non-collisional resistivity in the stage of maximum compression of the pinch. The drop of current to half or less of the peak value in a few (10–100) nanoseconds indicates that a plasma focus device can be used as a high power opening switch for megampere currents. The amount of energy absorbed by this type of switch can be made relatively small by adjusting the plasma focus parameters. Another important property of a switch, i.e., the ratio of the time interval during which the switch is closed over the time during which the switch is open can, in a switch of the plasma focus type be substantially larger than 10. At the megamp current level of operation this represents an outstanding factor of merit. If it is used as an opening switch, the plasma focus device is placed in a high megamp current circuit so that the current passes from one plasma focus electrode to the other through the current sheath.

A thin current sheath results critically from the initial conditions during the breakdown at the breach. For the purpose of operation as an opening switch, a thin current sheath is favorable because a thin sheath optimizes the anomalous (i.e., noncollisional) resistivity surge in the pinch, which controls the opening function of the switch. Other factors compete with this such as insulator sleeve outgassing, impurity concentration in the plasma gas. In general, a slow rise of the voltage between electrodes can increase the current sheath thickness and ultimately limits the amplitude of the final resistivity surge and thus limits the factor of merit of the plasma focus device used as an opening switch.

The improvements obtained with a field-distortion element of the present invention can be observed from the increase in neutron yield in a series of thousands of plasma focus shots as compared to a reference series of shots under the same conditions of filling pressure, capacitor bank voltage, energy, inductance, etc.). This increase is observed in the mean value and maximum value of the D—D neutron yield/shot, $Y_n$, during the pinch resistivity surge.

If $Y_n$ is compared with the peak value of the time derivative of the electrode current in the same shot for a large number (about $10^3$) of shots under similar conditions we find that $Y_n$ is a steadily increasing function of the peak value of this time derivative. (The time derivative of the plasma-focus electrode current may be measured from a magnetic-field probe near the gap of the plasma-focus main switch). The systematic increase of $Y_n$ observed with the field distortion elements of the present invention is determined by corresponding variations of the interelectrode current sheath (e.g., sheath thickness). This increase is therefore related to the reproducibility from shot to shot of the "strength" of the anomalous, i.e. non-collisional, resistivity surge in the pinch. This reproducibility is essential for using a plasma focus device in the repetitive mode in which a single diffuse sheath in a train of many current sheaths could negatively affect an entire sequence of "opening" functions of the switch.

Figure 4A:
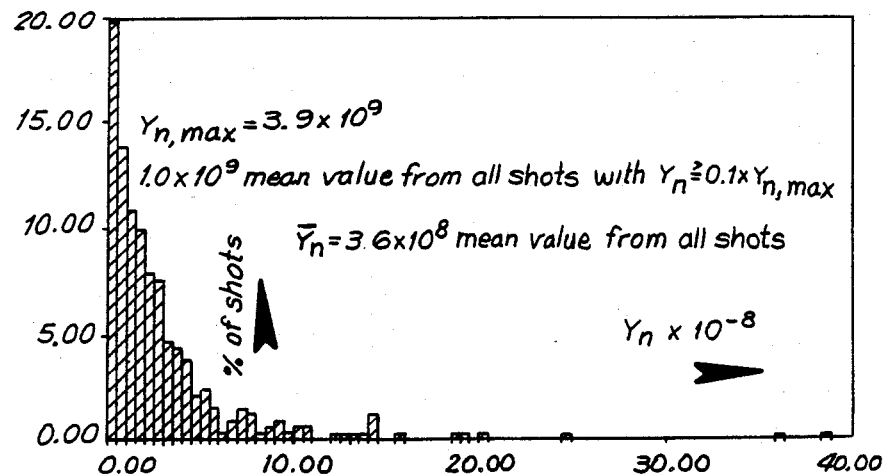
FIG. 4A depicts performance with the field distortion element of the prior art.
Figure 4B:
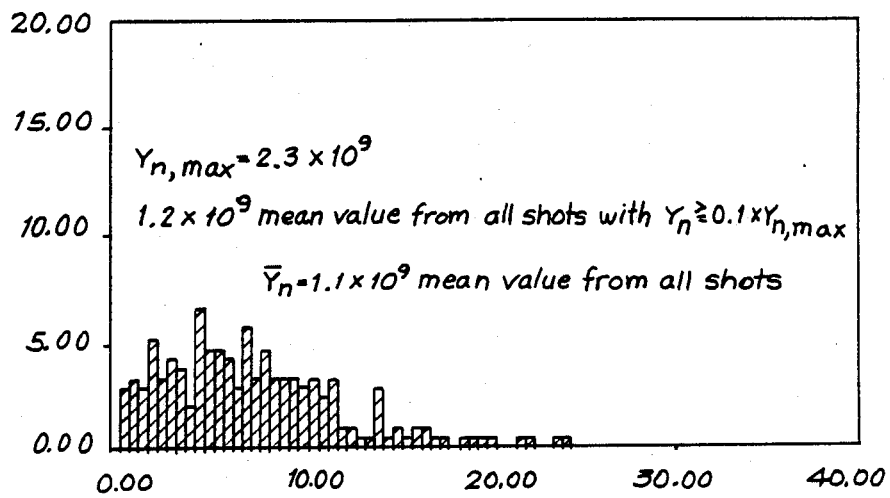
FIG. 4B depicts performance with the field distortion element of a preferred embodiment of the present invention.
Figure 5:
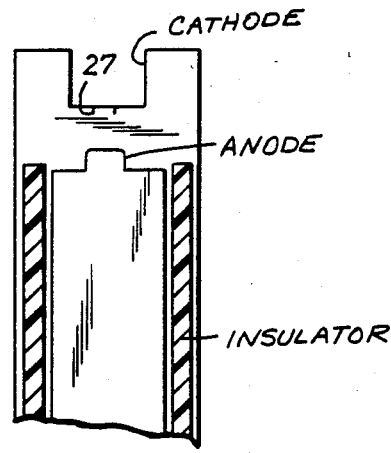
FIG. 5 depicts a Z-pinch configuration with a field distortion element.
Figure 6:
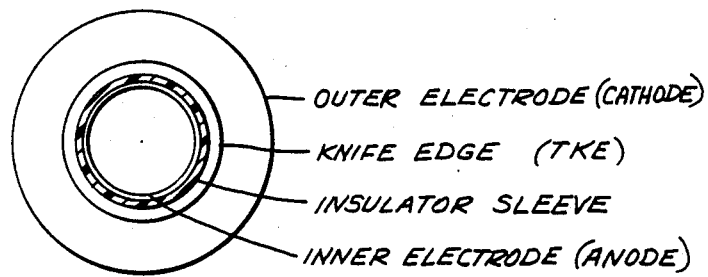
FIG. 6 depicts an axial view of a field distortion element comprising individual pins extending axially.

In the present invention the fluctuations from shot-to-shot of $Y_n$ of the plasma focus system are essentially eliminated and $Y_n$ is increased by a factor five (5) or larger as compared to a series of shots without a knife edge and by a factor larger than two or three as compared to a series of shots with a small-radius knife edge ("tight knife edge",) with the same choice of all the other operation conditions. FIGS. 4A, 4B and 4C are histograms showing the number of shots achieving a particular $Y_n$ as a function of $Y_n$ for (a) the field distortion element of the prior art, and (b) the field distortion element of the present invention. The piling up of events to the left of the figures indicates the relative unreliability of the prior art compared to the present invention. Our laboratory tests have provided an explanation for the greatly improved performance of a plasma focus system with a field distortion means of the present invention as compared to the performance of a plasma focus with a tight knife edge. A suitable knife edge at the plasma focus electrode breech provides the following benefits: (i) It increases the electric-field in the breakdown (interelectrode-discharge onset) region for a fixed value of the applied voltage. (ii) The relatively-large radius of a field distortion means of the present invention as compared to that of a tight knife edge lifts above the insulator surface the forming current sheath in the breakdown stage, as well as in the successive restrikes at a later time. This reduces the emission of impurity ions from the surface of the insulator sleeve, keeps the electric resistivity at a low value and prevents an increase of the current-sheath thickness during the breakdown stage. An initially-thin, high density, current sheath has a very strong effect on the entire evolution of the current sheath at all successive stages of the discharge and determines the overall performance of the plasma focus. (iii) The use of the present invention increases the volume of the gas in which the near-to-peak value of the electric field accelerates the current carriers (background electrons and positive ions) in the breakdown stage. This should be contrasted with the peak-field volume of a tight knife edge for which a greater part of the high-electric-field region near the sharp edge of the knife is inside the insulator sleeve. (iv) The current sheath during the breakdown stage forms along the path of minimum inductance, that is, very close to the insulator surface.

The distance of the knife edge from the insulator surface should not be too small in order to have the advantages listed in (ii), (iii) but can not exceed an optimum value (typically between 2 and 4 mm) above which detrimental effects on the structure of the onset current sheath becomes appreciable because of the distance of the onset current channels in the gas from the minimum-of-inductance path on the insulator surface.

The foregoing is a preferred embodiment of the invention and an explanation of its efficacy, but does not encompass all the ways in which the invention may be accomplished. The scope of the invention is described by the following claims and their equivalents.

I claim

1. A coaxial plasma accelerator for producing a dense plasma focus comprising
   (a) inner and outer coaxial electrodes displaced from each other by an interelectrode gap,
   said electrodes having a muzzle end adapted to converge and focus a current sheath at the end of a run down phase between said electrodes and a breech end opposed to said muzzle end
   (b) a sleeve of insulating material between said electrodes, said sleeve encircling said inner electrode
   (c) a gas filled tank enclosing said electrodes, said gas comprising deuterium at a pressure of 1–10 Torr,
   (d) a power supply connected by a power transmission line across said coaxial electrodes, said power supply further comprising
   at least one switch in said power transmission line between said power supply and said electrodes
   (e) said inner electrode diameter being at least about equal to said inner electrode axial length
   (f) field distortion means in said interelectrode gap at the breech end of said coaxial electrodes, said field distortion means comprising
   a cylindrical knife edge having a circular cross section and a base and being electrically connected to said breech side of said outer electrode displaced from the outer surface of said insulator sleeve by 1 to 4 mm.

2. A plasma focus apparatus comprising
   (a) inner and outer coaxial electrodes displaced from each other by an interelectrode gap,
   said electrodes having a muzzle end and a breech end opposed to said muzzle end
   (b) a sleeve of insulating material between said electrodes, said sleeve encircling said inner electrode
   (c) a gas filled tank enclosing said electrodes,
   (d) a power supply connected by a power transmission line across said coaxial electrodes, said power supply further comprising
   at least one switch in said power transmission line between said power supply and said electrodes
   (e) field distortion means in said interelectrode gap at the breech end of said coaxial electrodes, said field distortion means
   being electrically connected to said breech side of said outer electrode displaced from the outer surface of said insulator sleeve by 2 to 4 mm
   said field distortion means comprising a conducting material.

3. The invention according to claim 2 wherein said gas comprises deuterium.

4. The invention according to claim 3 wherein said gas is at a presure of 1 to 10 Torr.

5. The invention according to claim 2 wherein said inner electrode diameter is at least about equal to said inner electrode axial length.

6. The invention according to claim 2 wherein said inner electrode diameter is smaller than said inner electrode axial length.

7. The invention according to claim 2 wherein said power supply has an essentially inductive impedance determined by the inductance of said power supply and the inductance of said coaxial electrodes including the inductance of said power transmission lines and said switches.

8. The invention according to claim 2 wherein said field distortion means has a wall thickness which decreases toward the muzzle side and a length of 2–14 mm.

9. A coaxial plasma accelerator for producing a dense plasma focus comprising
   (a) inner and outer coaxial electrodes displaced from each other by an interelectrode gap,
       said electrodes having a muzzle end and a breech end opposed to said muzzle end
   (c) a gas filled tank enclosing said electrodes, said gas comprising deuterium at a pressure of 1–10 Torr,
   (d) a power supply connected by a power transmission line across said coaxial electrodes, said power supply further comprising
       at least one switch in said power transmission line between said power supply and said electrodes
   (e) said inner electrode diameter being smaller than said inner electrode axial length
   (f) field distortion means in said interelectrode gap at the breech end of said coaxial electrodes, said field distortion means comprising
       a cylindrical knife edge having a circular cross section in a plane orthogonal to the electrode axis and a relatively thick base and being electrically connected to said breech side of said outer electrode displaced from the outer surface of said insulator sleeve by a distance of at least 1 and less than 4 mm.

10. The invention according to claim 8 wherein said field distortion element has a triangular cross section in a plane containing the electrode axis.

11. The invention according to claim 8 wherein said field distortion element has straight sides.

12. The invention according to claim 8 wherein said field distortion element has curved sides.

13. The invention according to claim 2 wherein said field distortion means has a wall thickness which decreases toward the muzzle side and a length of 3–10 mm.

14. The coaxial plasma accelerator of claim 1 wherein said knife edge is formed of conducting material and comprises a wall thickness which decreases toward the muzzle side, and a triangular cross section in a plane containing the electrode axis and a length of 2–14 mm.

15. The coaxial plasma accelerator of claim 1 wherein said knife edge is formed of conducting material and comprises a wall thickness which decreases toward the muzzle side, and a triangular cross section in a plane containing the electrode axis and a length of 3–10 mm.

16. The coaxial plasma accelerator of claim 9 wherein said knife edge is formed of conducting material and comprises a wall thickness which decreases toward the muzzle side and a triangular cross section in a plane containing the electrode axis and a length of 2–14 mm.

17. The coaxial plasma accelerator of claim 9 wherein said knife edge is formed of conducting material and comprises a wall thickness which decreases toward the muzzle side and a triangular cross section in a plane containing the electrode axis and a length of 3–10 mm.

* * * * *